United States Patent Office 2,915,936
Patented Dec. 8, 1959

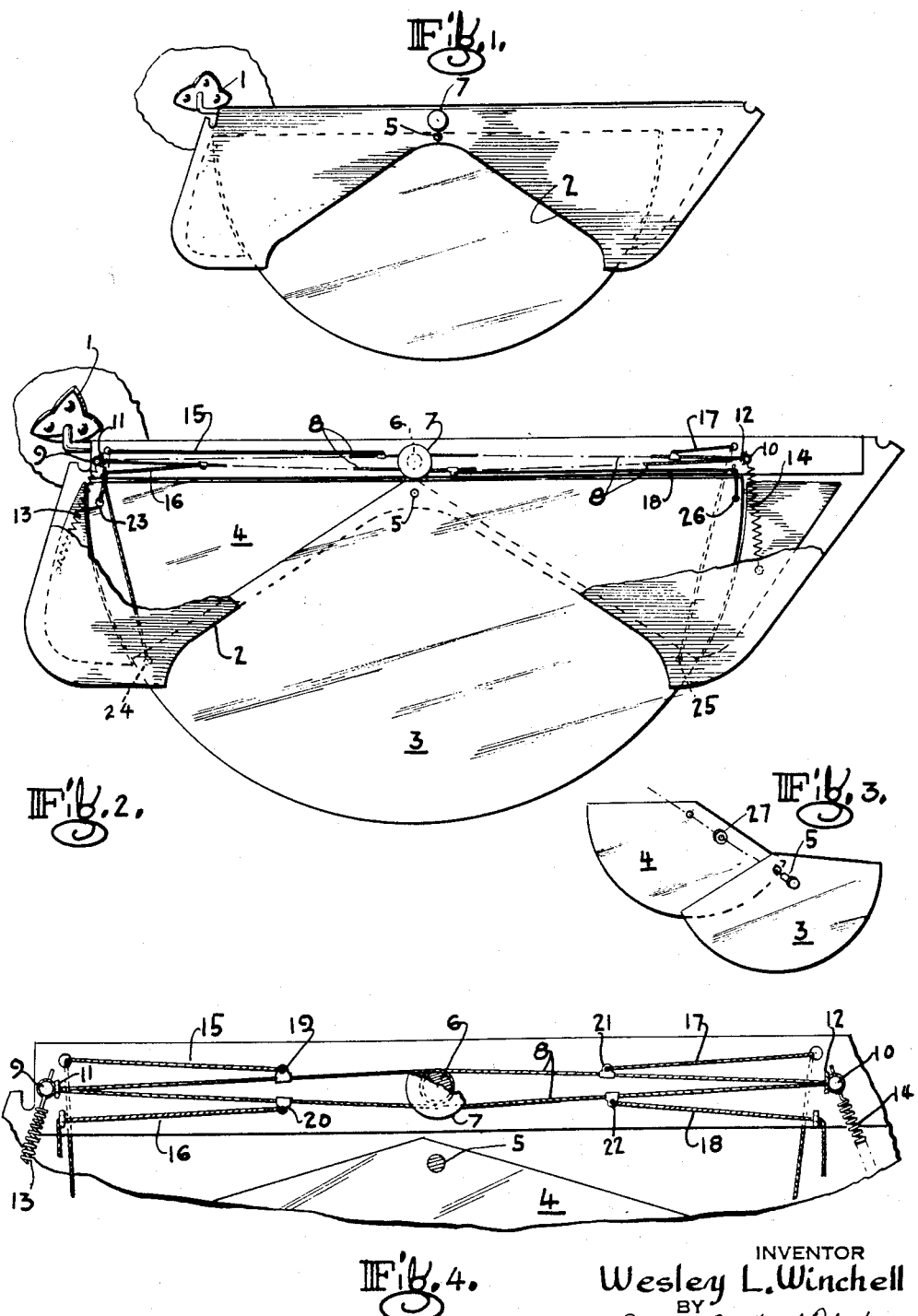

2,915,936

AUTOMOBILE VISOR WITH ROTATABLE LIGHT POLARIZERS

Wesley L. Winchell, Kingston, N.Y.

Application January 8, 1957, Serial No. 633,061

2 Claims. (Cl. 88—1)

This invention relates to visors for automobiles or the like, and particularly to a visor which can be adjusted as to the intensity of the light to be admitted therethrough.

It is an object of this invention to provide an automobile visor which can be mounted in place of the normal visor but which can control the amount of outside light reaching the eyes of the driver.

It is another object of this invention to provide an economical visor which is capable of easy adjustment to obtain varying degrees of opacity so that the operator of the automobile can make the necessary adjustments depending on the amount of exterior light and his own preferences.

The visor of the invention requires no special mountings and thus is simple to install. It is easily adjusted to various light polarizing positions and eliminates the need of costly tinted glass which has inherent disadvantages since it cannot be adjusted to obtain varying degrees of opacity.

The visor of the invention has a cutout portion in the main body, a pair of pieces of light polarizing material superimposed on each other and mounted so as to cover a part of the cutout portion. At least one of the pieces is pivotally mounted for movement relative to the other piece. Means are also provided for moving the pivotal piece about its pivot so that the intensity of the light reaching the operator can be adjusted.

These and other objects, features and advantages of the invention will become apparent from the following detailed description and drawings which are merely exemplary.

In the drawings:

Fig. 1 is a front elevation of the visor of the invention;

Fig. 2 is a front elevation of the visor of the invention with parts broken away to show its operation;

Fig. 3 is an exploded view of the pieces of polarized material showing their mounting on the pivot pin; and Fig. 4 is an enlarged view of the linkages between the spindle and the light polarizing pieces.

As shown in Fig. 1, the visor of the invention can be mounted on a conventional visor mounting bracket 1. The visor is made of two layers of covered fiberboard. A cutout portion 2 is provided in the range of vision of the operator so he will be looking through the light polarizing material mounted in the visor in a manner to be described hereinafter. Two pieces of light polarizing material 3 and 4 are provided, mounted in superimposed relation for rotation about pivot pin 5. It is to be understood that although both of the pieces are rotatable about the pivot pin in the preferred form shown in the drawings, the important feature is the relative position of the two pieces so that one piece may be fixed while the other is rotated relative thereto. As shown in the drawings, the preferred form of the invention has both pieces mounted for rotation about pivot pin 5, each piece being rotatable through an angle of 45°. The pieces are rotated in opposite directions, in a manner to be described later, so that the maximum relative displacement of the pieces is 90°. This allows the pieces of polarized material to be rotated from a position where the grains of the pieces are parallel to a position where the grains are crossed or perpendicular to each other, thereby changing the viewing portion of the visor from transparent to opaque.

The mechanism for rotating the pieces in opposite directions is shown in Figs. 2 and 4. A spindle 6 having a dial 7 thereon is rotatably mounted on the visor adjacent the cutout portion. A line 8 of suitable material, such as nylon cord, is wrapped around the spindle a suitable number of times, for example, two turns, and is slidably engaged at positions spaced from the spindle around pins 9 and 10. Rings 11 and 12 are mounted adjacent the pins and the line 8 passes therethrough. Springs 13 and 14, connected to the visor and the pins, maintain tension in the main line. Lines 15, 16, 17 and 18 attached respectively to rings 19, 20, 21 and 22 on the main line, are attached respectively at their other ends to holes 23, 24, 25 and 26 in the pieces 3 and 4. When the spindle is rotated clockwise from its Fig. 4 position to its Fig. 2 position, lines 15 and 17 move to the right rotating piece 3 counterclockwise about pivot pin 5, while lines 16 and 18 move to the left rotating piece 4 clockwise about the pivot pin. Since each piece is capable of moving through an angle of 45° in the preferred form of the invention, the pieces are capable of a relative movement of 90°. In order to allow for free relative rotation, a spacer 27 is provided between pieces 3 and 4.

It is to be understood that details of construction may be varied without departing from the spirit of the invention except as defined in the appended claims.

What is claimed is:

1. An automobile visor mounted for rotation about a horizontal axis; comprising a pair of faces spaced from each other and forming a cavity therebetween, each of said faces having complementary cutout portions therein on the edge opposite said horizontal axis which form a generally triangular shaped opening in said visor; a pair of sectoral shaped pieces of light polarizing material superposed on each other and mounted in said cavity for independent pivotal movement about a common transverse axis so that they will cover at least a part of said opening at all times, said transverse axis being located adjacent the apex of said opening nearest said horizontal axis; and means for rotating both of said pieces about said transverse axis simultaneously in opposite directions so that said pieces can be set to admit the desired intensity of light, said rotating means including a transversely extending rotatable spindle located adjacent the center of said horizontal axis, a continuous main strand coiled around said spindle, pin means on said visor on both sides of said spindle and spaced therefrom, said main strand slidably engaging both of said pin means, and a pair of secondary strands for each of said pieces, one strand of each pair having one end connected to the main strand between the spindle and one of said pin means and the other end connected to its related piece of light polarizing material adjacent one end of the arcuate edge thereof, the other strand of each pair having one end connected to the main strand between the spindle and the other of said pin means and the other end connected to said related piece of light polarizing material adjacent the other end of the arcuate edge thereof, the pair of secondary strands for one piece being connected to one run of the main strand and the pair of secondary strands for the other piece being connected to the other run of the main strand.

2. An automobile visor mounted for rotation about a horizontal axis; comprising a pair of faces spaced from each other and forming a cavity therebetween, each of said faces having complementary cutout portions therein on the edge opposite said horizontal axis which form a generally triangular shaped opening in said visor; a pair of sectoral shaped pieces of light polarizing material superposed on each other and mounted in said cavity for independent pivotal movement about a common transverse axis so that they will cover at least a part of said opening at all times, said transverse axis being located adjacent the apex of said opening nearest said horizontal axis, each of said pieces being mounted so that the maximum angular rotation of each piece is 45° thereby resulting in a maximum relative displacement between the pieces of 90°; and means for rotating both of said pieces about said transverse axis simultaneously in opposite directions so that said pieces can be set to admit the desired intensity of light, said rotating means including a transversely extending rotatable spindle located adjacent the center of said horizontal axis, a continuous main strand coiled around said spindle, pin means on said visor on both sides of said spindle and spaced therefrom, said main strand slidably engaging both of said pin means, a pair of secondary strands for each of said pieces, one strand of each pair having one end connected to the main strand between the spindle and one of said pin means and the other end connected to its related piece of light polarizing material adjacent one end of the arcuate edge thereof, the other strand of each pair having one end connected to the main strand between the spindle and the other of said pin means and the other end connected to said related piece of light polarizing material adjacent the other end of the arcuate edge thereof, the pair of secondary strands for one piece being connected to one run of the main strand and the pair of secondary strands for the other piece being connected to the other run of the main strand, and spring means for maintaining the main strand tensioned at all times.

References Cited in the file of this patent

UNITED STATES PATENTS

| | | |
|---|---|---|
| 942,393 | Konig | Dec. 7, 1909 |
| 2,526,889 | McComb | Oct. 24, 1950 |

FOREIGN PATENTS

| | | |
|---|---|---|
| 644,031 | France | May 26, 1928 |